United States Patent
Katagiri et al.

(10) Patent No.: US 8,206,172 B2
(45) Date of Patent: Jun. 26, 2012

(54) PLUG LOCK STRUCTURE

(75) Inventors: Toshiharu Katagiri, Aichi (JP); Keiji Kahara, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 13/220,337

(22) Filed: Aug. 29, 2011

(65) Prior Publication Data

US 2012/0047971 A1    Mar. 1, 2012

(30) Foreign Application Priority Data

Sep. 1, 2010    (JP) ................................. 2010-195672

(51) Int. Cl.
*H01R 13/627* (2006.01)
(52) U.S. Cl. ...................................................... 439/352
(58) Field of Classification Search .................. 439/352, 439/304, 372; 285/84, 85, 87
See application file for complete search history.

(56) References Cited

U.S. PATENT DOCUMENTS

| | | | | |
|---|---|---|---|---|
| 965,998 | A * | 8/1910 | Evans ............................... | 285/85 |
| 1,857,420 | A * | 5/1932 | Wolford .......................... | 285/85 |
| 3,575,482 | A * | 4/1971 | MacMaster et al. ....... | 312/332.1 |
| 3,744,009 | A * | 7/1973 | Teagno et al. ................. | 439/329 |
| 4,674,814 | A * | 6/1987 | Hoshino et al. ............... | 439/586 |
| 4,884,978 | A * | 12/1989 | Inaba et al. .................... | 439/352 |
| 4,919,627 | A * | 4/1990 | Cable ............................. | 439/263 |
| 5,122,076 | A * | 6/1992 | Pitts ............................... | 439/352 |
| 5,131,705 | A * | 7/1992 | Gluck et al. ................ | 294/82.32 |
| 5,210,681 | A * | 5/1993 | Hosoi et al. .............. | 361/679.32 |
| 5,330,235 | A * | 7/1994 | Wagner et al. ................... | 285/81 |
| 5,480,324 | A * | 1/1996 | Maegawa et al. ............. | 439/489 |
| 5,554,044 | A * | 9/1996 | Nishide .......................... | 439/352 |
| 5,641,299 | A * | 6/1997 | Meguro et al. ................ | 439/347 |
| 5,660,558 | A * | 8/1997 | Osanai et al. ................. | 439/353 |
| 5,741,150 | A * | 4/1998 | Stinson et al. ................ | 439/358 |
| 5,906,501 | A * | 5/1999 | Longueville et al. ......... | 439/327 |
| 5,911,445 | A * | 6/1999 | Lee ................................. | 285/84 |
| 5,954,370 | A * | 9/1999 | Pietersen .......................... | 285/7 |
| 5,988,693 | A * | 11/1999 | Street ............................. | 285/80 |
| 6,059,598 | A * | 5/2000 | Yamashita et al. ............ | 439/352 |
| 6,203,355 | B1 * | 3/2001 | Neblett et al. ................. | 439/372 |
| 6,206,431 | B1 * | 3/2001 | Street ............................. | 285/80 |
| 6,244,889 | B1 * | 6/2001 | James ............................ | 439/352 |

(Continued)

FOREIGN PATENT DOCUMENTS

JP    9-161898    6/1997

*Primary Examiner* — Amy Cohen Johnson
*Assistant Examiner* — Vladimir Imas
(74) *Attorney, Agent, or Firm* — Patterson Thuente Christensen Pedersen, P.A.

(57) ABSTRACT

A plug lock structure that locks a power feeding plug to an inlet, which is fixed to a power feeding subject. The inlet includes a catch. The power feeding plug includes a hook, hooked to the catch, and an operation portion, which separates the hook from the catch. The plug lock structure includes a lock member pivoted in a direction in which the lock member forces the hook against the catch and a direction in which the lock member moves away from the catch together with the hook. A lock block is moved between a first position, at which the lock block permits pivoting of the lock member when the hook moves from the hooked state, and a second position, at which the lock block restricts pivoting of the lock member by contacting the lock member when the hook moves from the hooked state.

8 Claims, 5 Drawing Sheets

U.S. PATENT DOCUMENTS

| | | | |
|---|---|---|---|
| 6,257,914 B1 * | 7/2001 | Comerci et al. | 439/357 |
| 6,382,680 B1 * | 5/2002 | Horimoto | 285/81 |
| 6,461,185 B2 * | 10/2002 | James | 439/352 |
| 6,494,729 B1 * | 12/2002 | Stathopoulos et al. | 439/160 |
| 6,506,071 B2 * | 1/2003 | Lange | 439/358 |
| 6,648,667 B2 * | 11/2003 | Heidenreich et al. | 439/352 |
| 6,790,070 B1 * | 9/2004 | England, II | 439/372 |
| 6,945,808 B1 * | 9/2005 | Hisamatsu | 439/358 |
| 6,971,915 B1 * | 12/2005 | Mao et al. | 439/607.37 |
| 7,001,200 B2 * | 2/2006 | Yoshie | 439/358 |
| 7,628,636 B2 * | 12/2009 | Yu et al. | 439/352 |
| 7,632,116 B2 * | 12/2009 | Lee et al. | 439/157 |
| 7,883,369 B1 * | 2/2011 | Sun et al. | 439/607.35 |
| 7,997,920 B1 * | 8/2011 | Sun et al. | 439/345 |

* cited by examiner

PLUG LOCK STRUCTURE

CROSS-REFERENCE TO RELATED APPLICATIONS

This application is based upon and claims the benefit of priority from prior Japanese Patent Application No. 2010-195672, filed on Sep. 1, 2010, the entire contents of which are incorporated herein by reference.

BACKGROUND OF THE INVENTION

The present invention relates to a plug lock structure.

Automobile manufactures are now concentrating on the development of electric vehicles to lower exhaust gas emissions. An electric vehicle uses a battery as a power source. The battery must be charged, for example, in a household or at a charging station whenever the state of charge of the battery becomes low. Japanese Laid-Open Patent Publication No. 9-161898 describes a charging system that is applied to an electric vehicle. In this charging system, a vehicle includes an inlet, which is connectable to a power feeding plug that extends from, for example, a household outlet of a commercial power supply. When the power feeding plug is connected to the inlet, the battery is charged by the power fed to the vehicle from the commercial power supply.

The time required to charge the battery of an electric vehicle is relatively long compared to filling a gasoline vehicle with fuel. Thus, the vehicle is often left unattended over a long period of time with the power feeding plug connected to the inlet of the vehicle. As a result, someone may remove the power feeding plug from the vehicle when power is being fed and connect the power feeding plug to an inlet of another vehicle to steal electricity. Further, the power feeding plug itself may be stolen.

SUMMARY OF THE INVENTION

The present invention provides a plug lock structure that prevents unauthorized removal of a power feeding plug.

One aspect of the present invention is a plug lock structure that locks a power feeding plug to an inlet, which is fixed to a power feeding subject. The inlet includes a catch. The power feeding plug includes a hook, which can be hooked to the catch, and an operation portion, which separates the hook from the catch to unhook the hook. The plug lock structure includes a lock member that is pivotable in a direction in which the lock member forces the hook against the catch with an urging force. When the hook moves away from the catch, the lock member is pivoted in a direction in which the lock member moves away from the catch together with the hook. A lock block moves between a first position, at which the lock block permits pivoting of the lock member when the hook moves from a state hooked to the catch, and a second position, at which the lock block restricts pivoting of the lock member by contacting the lock member when the hook moves from the hooked state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A first embodiment of a plug lock structure will now be described with reference to FIGS. 1 to 6.

Figure 1:
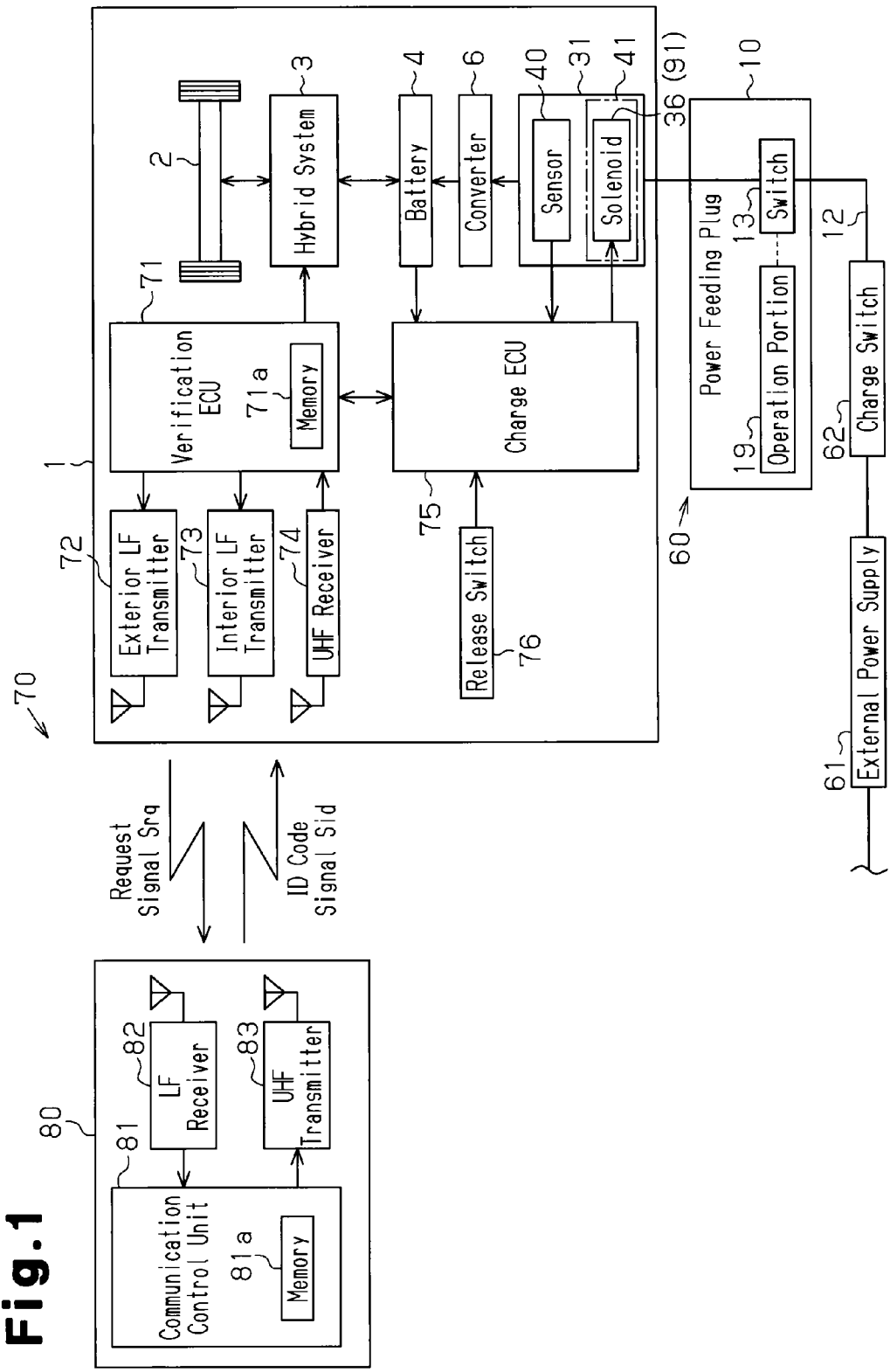
FIG. 1 is a schematic diagram showing a first embodiment of a charging system and a hybrid vehicle.

Referring to FIG. 1, a hybrid vehicle 1 includes a hybrid system 3 that uses an engine and a motor as driving sources that drive wheels 2. The hybrid system 3 operates in various modes, such as a mode for mechanically transmitting power from only the engine to the wheels 2, a mode for generating electric power with the engine to run the motor and drive the wheels 2, a mode for directly driving the wheels 2 with both the engine and the motor, and a mode for driving the wheels 2 with only the motor and without the engine.

The hybrid system 3 is connected to a battery 4 that supplies the battery 4 with power. In addition to being charged with the electric power generated by the engine, the battery 4 can be charged by an external power supply 61 from outside the vehicle 1.

The vehicle 1 includes an electronic key system 70 that allows the doors to be locked and unlocked without the need for the driver to actually operate a vehicle key. The electronic key system 70 includes an electronic key 80 that performs wireless communication with the vehicle 1.

The vehicle 1 includes a verification electronic control unit (ECU) 71 that performs ID code verification with the electronic key 80 and the vehicle 1. The verification ECU 71 includes a memory 71a that stores an ID code as a unique key code. The verification ECU 71 is connected to an exterior low frequency (LF) transmitter 72, an interior LF transmitter 73, and an ultrahigh frequency (UHF) receiver 74. The exterior LF transmitter 72 is arranged in each door of the vehicle 1 and transmits a signal carried on the LF band outside the vehicle. The interior LF transmitter 73 is arranged in the floor inside the vehicle and transmits a wireless signal carried on the LF band inside the vehicle. The UHF receiver 74 receives a wireless signal carried on the UHF band.

The electronic key 80 includes a communication control unit 81. The communication control unit 81 includes a memory 81a that stores a unique ID code. The communication control unit 81 is connected to an LF receiver 82, which receives a wireless signal in the LF band, and a UHF transmitter 83, which transmits a wireless signal in the UHF band.

The verification ECU 71 forms an exterior communication area around the vehicle 1 by intermittently transmitting a request signal Srq, which is carried on the LF band, from the exterior LF transmitter 72. When the electronic key 80 enters the exterior communication area, the LF receiver 82 receives the request signal Srq with the LF receiver 82. Upon recognition of the request signal Srq received by the LF receiver 82, the communication control unit 81 transmits an ID code signal Sid, which contains the ID code registered in the memory 81a, from the UHF transmitter 83. When the UHF receiver 74 receives the ID code signal Sid, the verification ECU 71 performs ID verification (exterior verification) with the ID code registered in the memory 71a and the ID code contained in the ID code signal Sid. When the exterior verification is accomplished, the verification ECU 71 permits or performs unlocking of the doors with a door locking device (not shown).

After the exterior verification is accomplished and the door is unlocked, when recognizing that the driver has opened a door and entered the vehicle, the verification ECU 71 transmits the request signal Srq from the interior LF transmitter 73 to form an interior communication area that extends over the entire interior of the vehicle. When the electronic key 80 enters the interior communication area, the electronic key 80 transmits the ID code signal Sid in the same manner as described above. When the UHF receiver 74 receives the ID code signal Sid with the UHF receiver 74, the verification ECU 71 performs ID verification (interior verification) with the ID code registered in the memory 71a and the ID code contained in the ID code signal Sid. When the interior verification is accomplished, the verification ECU 71 permits activation of the hybrid system 3.

As shown in FIG. 1, the battery 4, which is mounted on the vehicle 1, is charged by a plug-in type charging system 60. The charging system 60 includes a power feeding plug 10, which is connected by a connection cable 12 to an external power supply 61 in a household or at a charging station. The power feeding plug 10 is connectable to the vehicle 1. The external power supply 61 supplies the vehicle 1 with AC power through the power feeding plug 10. A charge switch 62 is arranged on the connection cable 12 and operated to start charging. In a state in which the power feeding plug 10 is connected to the vehicle 1, when the charge switch 62 is turned on or off, a corresponding signal is provided to the vehicle 1 through the power feeding plug 10.

The vehicle 1 includes an inlet 31 to which the power feeding plug 10 is connected. The inlet 31 is a connector component into which the power feeding plug 10 is inserted and arranged in, for example, a side surface of a vehicle body. The inlet 31 includes a lock structure 41, which switches the power feeding plug 10, which is fitted into the inlet 31, between a locked state and an unlocked state. In the locked state, removal of the power feeding plug 10 from the inlet 31 is restricted. In the unlocked state, removal of the power feeding plug 10 from the inlet 31 is permitted.

The fitting of the inlet 31 to the power feeding plug 10 electrically connects the inlet 31 and the power feeding plug 10. A converter 6 converts the AC power fed to the vehicle 1 through the inlet to DC power and supplies the battery 4 with the DC power. This charges the battery 4.

The vehicle 1 includes a charge ECU 75 that controls charging. The charge ECU 75 is communicable with the verification ECU 71 through an interior local area network (LAN), which is not shown in the drawings. The charge ECU 75 communicates with the verification ECU 71 to check the ID verification results.

When the power feeding plug 10 is fitted to the inlet 31, the charge ECU 75 and the charge switch 62 are connected to each other by a signal line. In this state, based on the resistance of the signal line between the charge ECU 75 and the charge switch 62, the charge ECU 75 determines that the fitting of the power feeding plug 10 into the inlet 31 has been completed. The charge ECU 75 can perform charging when the exterior verification is satisfied and the fitting of the power feeding plug 10 into the inlet 31 is completed. In this state, the charge ECU 75 controls the converter 6 to start charging the battery 4.

The lock structure 41 includes a solenoid 36. The charge ECU 75 controls the activation of the solenoid 36. Activation of the solenoid 36 switches the power feeding plug 10 between a locked state and an unlocked state. Further, a release switch 76 is arranged in the vehicle 1 near the inlet 31. When the release switch 76 is operated, a corresponding operation signal is provided to the charge ECU 75. When exterior verification is accomplished and the release switch 76 is operated, the charge ECU 75 activates the solenoid 36 to switch the power feeding plug 10 to the unlocked state. This allows the power feeding plug 10 to be removed from the inlet 31.

The structure of the power feeding plug 10, the inlet 31, and the lock structure 41 will now be described in detail with reference to FIGS. 2 to 4.

<Power Feeding Plug>

Figure 2:
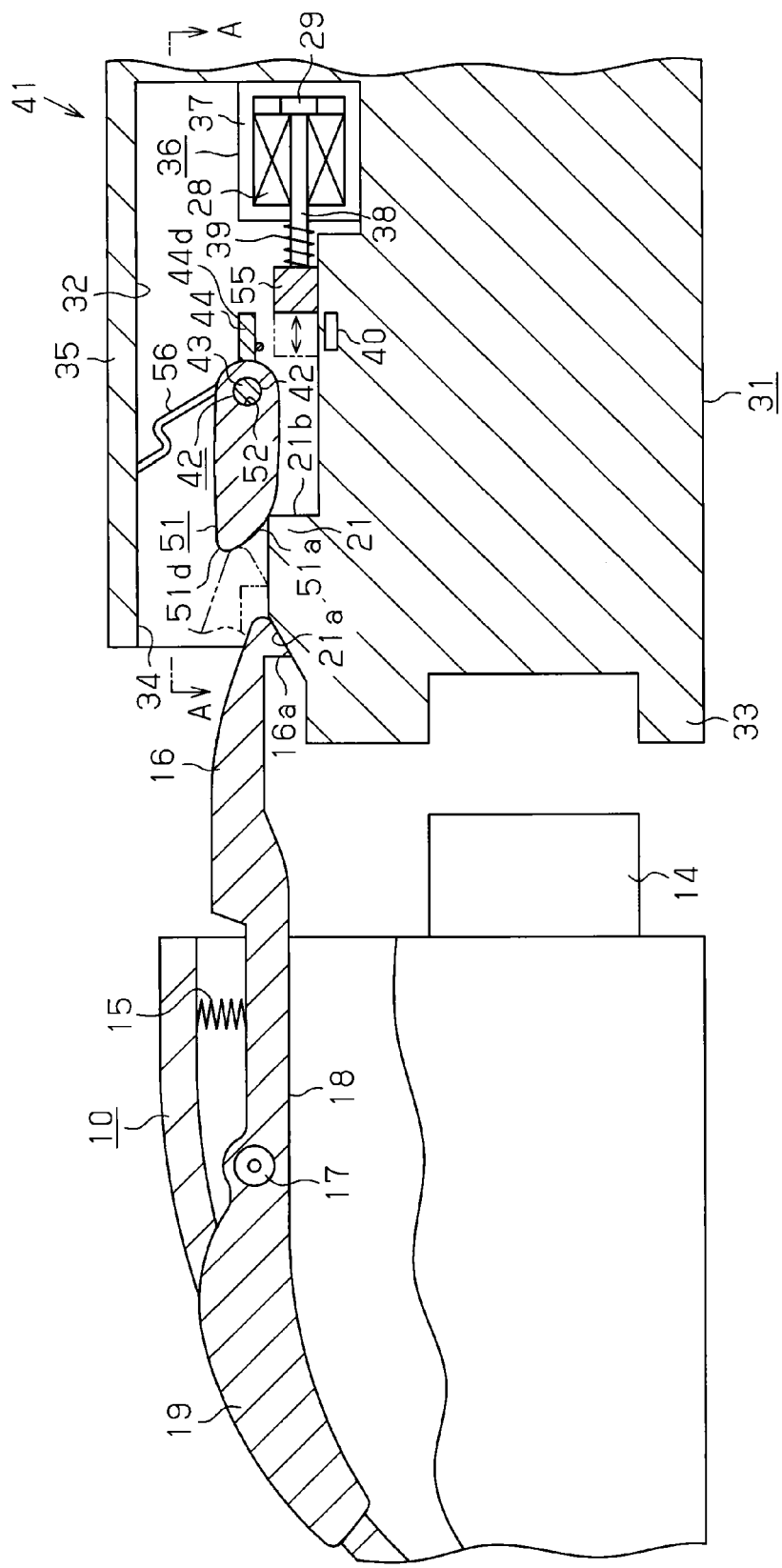
FIG. 2 is a cross-sectional view taken along line B-B in FIG. 3 showing an inlet and a lock structure before a power feeding plug is fitted to the inlet in the first embodiment.

Referring to FIG. 2, the power feeding plug 10 includes a cylindrical coupler 14, which is fitted to the inlet 31. Connection terminals (not shown) are arranged in the coupler 14 to electrically connect the power feeding plug 10 to the inlet 31. The connection terminals include a power terminal, which is connected by a power line to the external power supply 61 and forms a power transmission path, and a control terminal, which is connected by a signal line to the charge switch 62 to form a signal communication path. The connection cable 12 includes an insulator that covers the power line and signal line.

As shown in FIG. 2, a lock arm 18, which is arranged in the power feeding plug 10, extends in a longitudinal direction (sideward direction as viewed in FIG. 2) of the power feeding plug 10. The lock arm 18 is pivotal about a pivot shaft 17 located at the middle of the lock arm 18 in the longitudinal direction. The lock arm 18 includes a distal portion that forms a hook 16. An operation portion 19 is defined on the lock arm 18 at the side opposite to the hook 16. The operation portion 19 is exposed from the power feeding plug 10. The hook 16 includes a downwardly bent distal end that defines a bent portion 16a.

An urging spring 15 is arranged between the lock arm 18 and an inner wall surface of the power feeding plug 10. The urging spring 15 is arranged in the power feeding plug 10 between the pivot shaft 17 and the hook 16. Accordingly, the urging spring 15 urges the lock arm 18 about the pivot shaft 17 in a clockwise direction as viewed in FIG. 2. The hook 16 is normally held at an initial position in which the urging spring 15 is in an expanded state. The gap between the lock arm 18 and the inner wall surface of the power feeding plug 10 allows pivoting of the hook 16 about the pivot shaft 17 in the counterclockwise direction as viewed in FIG. 2 against the urging force of the urging spring 15. Thus, when the operation portion 19 is pushed, the hook 16 moves upward from the initial position shown in FIG. 2 about the pivot shaft 17 against the urging force of the urging spring 15. When the operation portion 19 is released from the operation force, the urging force of the urging spring 15 returns the hook 16 to the initial position.

<Inlet>

As shown in FIG. 2, the inlet 31 includes a cylindrical socket 33, which is formed to receive the coupler 14 of the power feeding plug 10. The socket 33 includes connection terminals (not shown). The connection terminals include a power terminal, which is connected by a power line to the converter 6 and forms a power transmission path from the external power supply 61, and a control terminal, which is connected by a signal line to the charge ECU 75 to form a signal communication path from the charge switch 62.

When the coupler 14 is fitted to the socket 33, the connection terminals of the coupler 14 are electrically connected to the connection terminals of the socket 33. In this state, power is supplied by the power lines from the external power supply 61 to the battery 4, and a signal is provided by the signal lines from the charge switch 62 to the charge ECU 75.

As shown in FIG. 2, a catch 21 is formed on the outer surface of the socket 33. The catch 21 includes an inclined surface 21a and a hooking surface 21b. The inclined surface 21a is enlarged and inclined outward in the radial direction toward the basal side of the socket 33 (toward the right in FIG. 2) from the outer surface of the socket 33. The hooking surface 21b is generally orthogonal to the outer surface of the socket 33. The inclined surface 21a is formed facing toward the power feeding plug 10, and the hooking surface 21b is formed facing toward an inner side of the vehicle 1. When the power feeding plug 10 is fitted into the inlet 31, the hook 16 is hooked to the catch 21. The hook 16 and the catch 21 form a plug holding mechanism that restricts removal of the power feeding plug 10 from the inlet 31.

As shown in FIG. 1, the power feeding plug 10 includes a switch 13, which is activated and deactivated in accordance with the position of the operation portion 19 (lock arm 18). The switch 13 is arranged on a signal line connected to the charge switch 62. The resistance of the signal line changes when the switch 13 is switched between an activated state and a deactivated state. For example, when the operation portion 19 is operated and the hook 16 is hooked to the catch 21, that is, when the power feeding plug 10 is fitted to the inlet 31, the switch 13 is activated. This increases the resistance of the signal line. The charge ECU 75 determines the position of the lock arm 18 and, consequently, whether the hook 16 is in a locked state based on the resistance of the signal line. When the signal line connected to the charge switch 62 is active and the hook 16 is in a hooked state, the charge ECU 75 determines that fitting of the power feeding plug 10 into the inlet 31 has been normally completed.

<Lock Structure>

As shown in FIG. 2, a lock structure 41 is arranged in a case 35, which is formed integrally with an upper portion of the inlet 31. As shown in FIG. 3, the case 35 includes a side surface facing toward the power feeding plug 10 (left surface as viewed in FIG. 3) that includes a hooking cavity 34, which receives the hook 16. An accommodation chamber 32 is formed adjacent to the hooking cavity 34 in the case 35. The accommodation chamber 32 extends in the sideward direction as viewed in FIG. 3 and is located toward the inner side of the vehicle 1 (toward the right as viewed in FIG. 3) from the hooking cavity 34. An insertion hole 35a connects one end of the hooking cavity 34 (right end as viewed in FIG. 3) with one end of the accommodation chamber 32 (left end as viewed in FIG. 3). The insertion hole 35a extends in a direction perpendicular to the hooking cavity 34 and the accommodation chamber 32. The accommodation chamber 32 is closed except at the insertion hole 35a.

Figure 3:
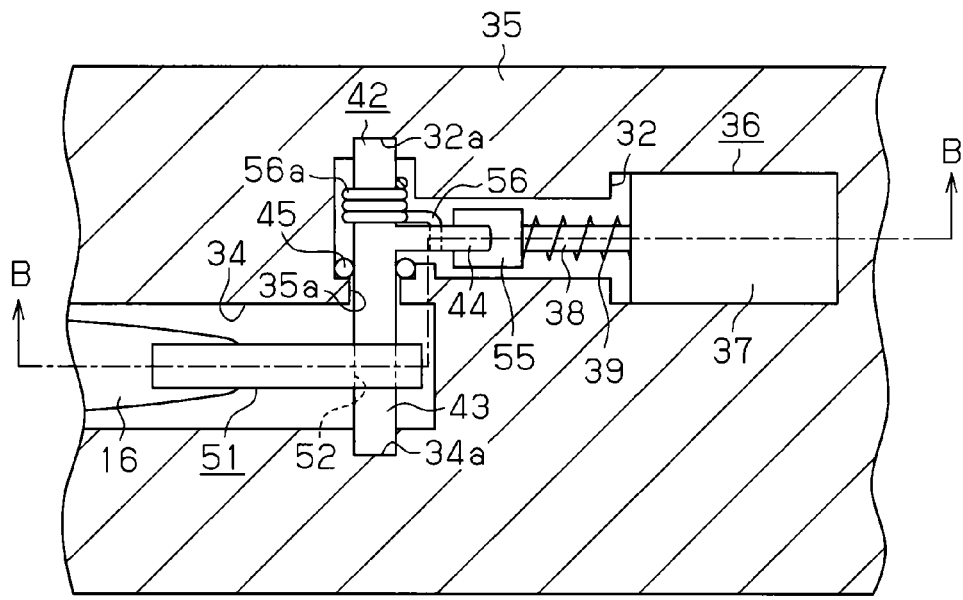
FIG. 3 is a cross-sectional view taken along line A-A in FIG. 2.

As shown in FIG. 3, the lock structure 41 includes a lock lever 42 and a lock bar 51 in addition to the solenoid 36.

The lock lever 42 includes a cylindrical shaft 43 (rotation shaft), which includes two ends pivotally supported by inner walls of the case 35. The shaft 43 extends through the insertion hole 35a in a direction orthogonal to the fitting and removal directions of the power feeding plug 10, as viewed in FIG. 3. A pivot hole 32a is formed in the inner wall of the accommodation chamber 32 at a portion facing toward the insertion hole 35a. A further pivot hole 34a is formed in the inner wall of the hooking cavity 34 facing toward the insertion hole 35a. The pivot hole 32a of the accommodation chamber 32 pivotally supports one end of the shaft 43, and the pivot hole 34a of the hooking cavity 34 pivotally supports the other end of the shaft 43.

A rod-shaped pivot portion 44 extends from a circumferential surface of the shaft 43 toward the inner side of the vehicle 1 (rightward as viewed in FIG. 3) in the longitudinal direction of the accommodation chamber 32. An O ring 45, which is formed by an annular rubber seal, is arranged around the insertion hole 35a in the accommodation chamber 32. The O ring 45 is arranged on the circumference of the shaft 43 in a state compressed in the sideward direction as viewed in FIG. 3. The shaft 43 is rotatable relative to the inner surface of the O ring 45. This structure seals the gap between the circumferential surface of the shaft 43 and the wall of the insertion hole 35a. Accordingly, water and dust from the hooking cavity 34 are prevented from entering the accommodation chamber 32 through the insertion hole 35a. This prevents the solenoid 36 (actuator) from being damaged by water and moisture. Further, the friction produced by movement of a lock block 55 and lock bar 51 is prevented from being increased by dust.

As shown in FIG. 2, the lock bar 51 has a generally elliptic cross-section and is accommodated in the hooking cavity 34 in the insertion direction of the hook 16. The lock bar 51 includes a basal portion (right end as viewed in FIG. 2) through which a shaft hole 52 extends. The shaft 43 is fitted into the shaft hole 52 so as to fix the lock bar 51 to the lock lever 42. The lock bar 51 is pivotal about the shaft 43 in the hooking cavity 34. The lock bar 51 and the lock lever 42 are pivoted integrally about the shaft 43.

The lock bar 51 includes a distal portion 51d, which extends from the basal portion to which the shaft 43 is fitted toward the power feeding plug 10. The distal portion 51d includes an upper surface, which contacts an upper surface of the hooking cavity 34, and a lower surface 51a, which contacts an upper surface of the catch 21. This restricts the pivoting of the lock bar 51. A torsion spring 56 produces urging force that constantly urges the lock lever 42 in the counterclockwise direction as viewed in FIG. 4. As shown in FIG. 3, the torsion spring 56 includes a coil 56a. The coil 56a is fitted to the shaft 43 between the pivot portion 44 and the pivot hole 32a. The torsion spring 56 has one end extending toward the inner side of the vehicle 1 and hooked to a lower side of the pivot portion 44. The torsion spring 56 has another end fixed to the upper surface accommodation chamber 32 as shown in FIG. 2. In an initial state in which the power feeding plug 10 is not connected to the inlet 31, the urging force of the torsion spring 56 holds the lower surface 51a of the lock bar 51 at the distal portion 51d in contact with a corner formed between the upper surface of the catch 21 and the hooking surface 21b. In the initial state, the pivot portion 44 is parallel to the axial direction of the inlet 31, that is, the fitting and removal directions of the power feeding plug 10.

Figure 4:
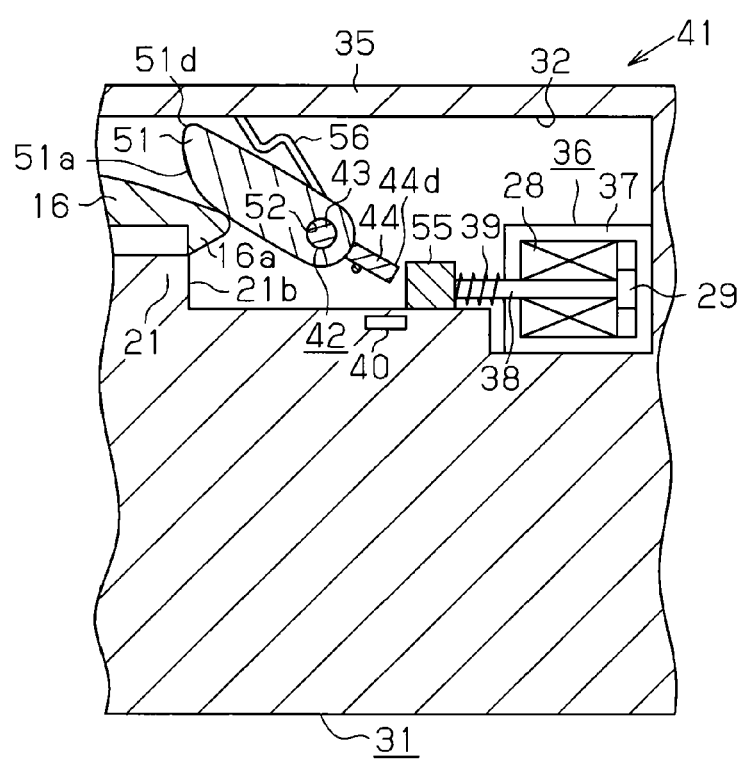
FIG. 4 is a cross-sectional view taken along line B-B in FIG. 3 showing the inlet and the lock structure when the power feeding plug is being fitted to the inlet in the first embodiment.

In the initial state, when an external force is applied to the lower surface 51a of the lock bar 51, the lock bar 51 is pivoted with the lock lever 42 in the clockwise direction as viewed in FIG. 4 against the urging force of the torsion spring 56. This moves a distal portion 44d of the pivot portion 44 toward an inner surface of the inlet 31, that is, the bottom surface of the accommodation chamber 32. When the lock bar 51 is released from the external force, the urging force of the torsion spring 56 returns the lock bar 51 and the lock lever 42 to the initial position. In the present example, the lock bar 51 and the lock lever 42 form a lock member, the distal portion 51d of the lock bar 51 corresponds to a first end portion of the lock member, and the distal portion 44d of the pivot portion 44 corresponds to a second end portion of the lock member.

As shown in FIG. 2, the solenoid 36 is arranged in the accommodation chamber 32 at the innermost side relative to the vehicle 1. The solenoid 36 includes a main body 37 and a rod-shaped plunger 38, which projects from the main body 37. The plunger 38 is formed from a magnetic body and extends in an axial direction of the inlet 31 (fitting and removal directions of the power feeding plug 10) toward the power feeding plug 10. The lock block 55, which is box-shaped, is arranged on a distal end of the plunger 38. A coiled urging spring 39 is arranged on the plunger 38 between the lock block 55 and the main body 37. The urging force of the urging spring 39 constantly urges the plunger 38 toward the left as viewed in FIG. 2.

In the present example, the solenoid 36 is of a self-sustaining type. The solenoid 36 includes a coil 28 and a magnet 29, which are arranged in the main body 37. When current flows to the coil 28, the magnetic force of the coil 28 generates an attraction force or a repulsion force between the plunger 38 and the magnet 29. The direction of the current supplied to the coil 28 is changed to switch between the attraction force and the repulsion force. The magnetic attraction force fixes the plunger 38 to the magnet 29. Since the plunger 38 is a magnetic body, the plunger 38 remains attracted to the magnet 29 even after current stops flowing to the coil 28. Accordingly, the plunger 38 remains in a state retracted into the main body 37 against the urging force of the urging spring 39. In this state, the lock block 55 is located at a first position and separated from the distal portion 44d of the pivot portion 44 toward the right as viewed in FIG. 2. At the first position, the lock block 55 does not restrict pivoting of the pivot portion 44 about the shaft 43.

The magnetic repulsion force allows the plunger 38 to be separated from the magnet 29. As a result, the urging force of the urging spring 39 projects the plunger 38 from the main body 37. In this state, the plunger 38 and the magnet 29 are separated even when current stops flowing to the coil 28. Thus, the plunger 38 and the magnet 29 are not attracted by magnetic force to each other. In this state, as shown by the broken lines in FIG. 2, the lock block 55 is arranged at a second position under the pivot portion 44. At the second position, the lock block 55 restricts pivoting of the pivot portion 44 about the shaft 43.

In this manner, the activation of the solenoid 36 switches the lock block 55 between the first position and the second position. When the lock block 55 is held at any one of the first and second positions, the solenoid 36 does not have to be activated. This reduces power consumption.

Further, as shown in FIG. 2, a sensor 40 is arranged in the inlet 31 at a location corresponding to the second position of the lock block 55. The sensor 40 is a proximity sensor that detects the approach of the lock block 55. The detection result of the sensor 40 is provided to the charge ECU 75. Based on the detection result of the sensor 40, the charge ECU 75 determines whether the lock block 55 is located at the first position or second position.

The operation of the lock structure 41 when fitting and removing the power feeding plug 10 will now be described.

Referring to FIG. 2, as the coupler 14 moves toward the socket 33, the hook 16 moves into the hooking cavity 34. At the first position, the lock block 55 does not restrict pivoting about the shaft 43 of the pivot portion 44. As the coupler 14 of the power feeding plug 10 becomes further closer to the socket 33, the bent portion 16a of the hook 16 ascends along the inclined surface 21a of the catch 21. As the hook 16 ascends along the inclined surface 21a, the lock arm 18 is pivoted about the pivot shaft 17 in the counterclockwise direction as viewed in FIG. 2 against the urging force of the urging spring 15.

When the power feeding plug 10 is further fitted into the inlet 31, the distal end of the bent portion 16a contacts the lower surface 51a of the lock bar 51 at the distal portion 51d. From this state, as the power feeding plug 10 is further fitted into the inlet 31, as shown in FIG. 4, the bent portion 16a lifts the lock bar 51 against the urging force of the torsion spring 56. This pivots the lock bar 51 in the clockwise direction as viewed in FIG. 4 together with the lock lever 42. In this state, the lock block 55 is located at the first position. Thus, the pivoting of the pivot portion 44 is not restricted.

Figure 5:
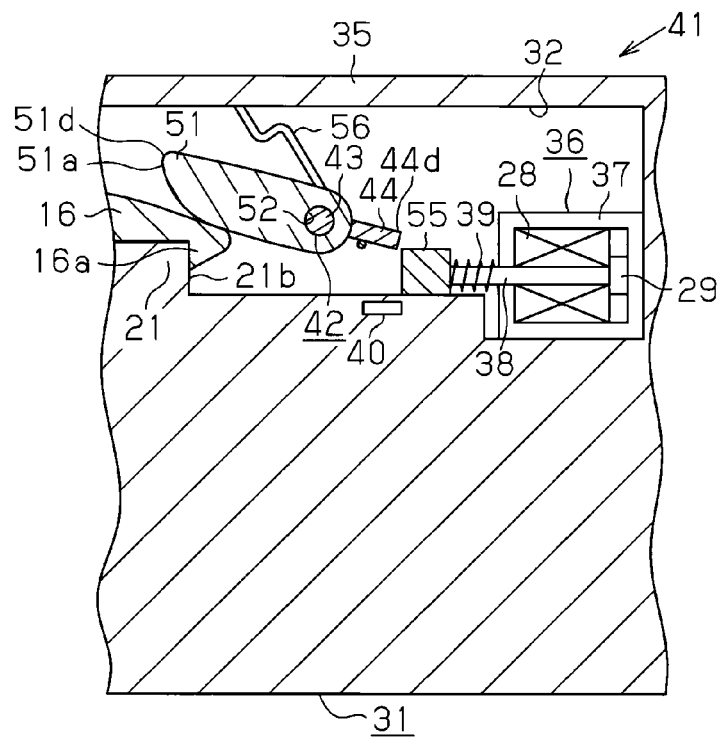
FIG. 5 is a cross-sectional view showing an unlocked state of the inlet and the lock structure in the first embodiment.

Then, when the power feeding plug 10 is further fitted into the inlet 31, as shown in FIG. 5, the bent portion 16a moves along the upper surface of the catch 21 and then moves over the hooking surface 21b. In this state, the urging force of the urging spring 15 pivots the lock arm 18 and lowers the hook 16. This hooks the bent portion 16a of the hook 16 to the hooking surface 21b of the catch 21. As the hook 16 moves downward, the urging force of the torsion spring 56 pivots the lock bar 51 in the counterclockwise direction as viewed in FIG. 5 with the lock bar 51 in contact with a surface of the hook 16 that faces away from the bent portion 16a. Here, the distal portion 44d of the pivot portion 44 is separated from the bottom surface of the accommodation chamber 32 by a distance that is slightly greater than the height of the upper surface of the lock block 55.

As described above, when the switch 13 arranged on the power feeding plug 10 is switched between an activated state and a deactivated state, the resistance of the signal line connecting the power feeding plug 10 and the charge ECU 75 changes. The charge ECU 75 detects changes in the resistance of the signal line to determine whether or not the hook 16 is hooked to the catch 21, that is, whether the fitting of the power feeding plug 10 to the inlet 31 has been normally completed.

When the charge ECU 75 determines that normal fitting of the power feeding plug 10 into the inlet 31 has been normally completed and checks with the verification ECU 71 that ID verification has been accomplished, the charge ECU 75 activates the solenoid 36 to move the lock block 55 from the first position to the second position.

Figure 6:
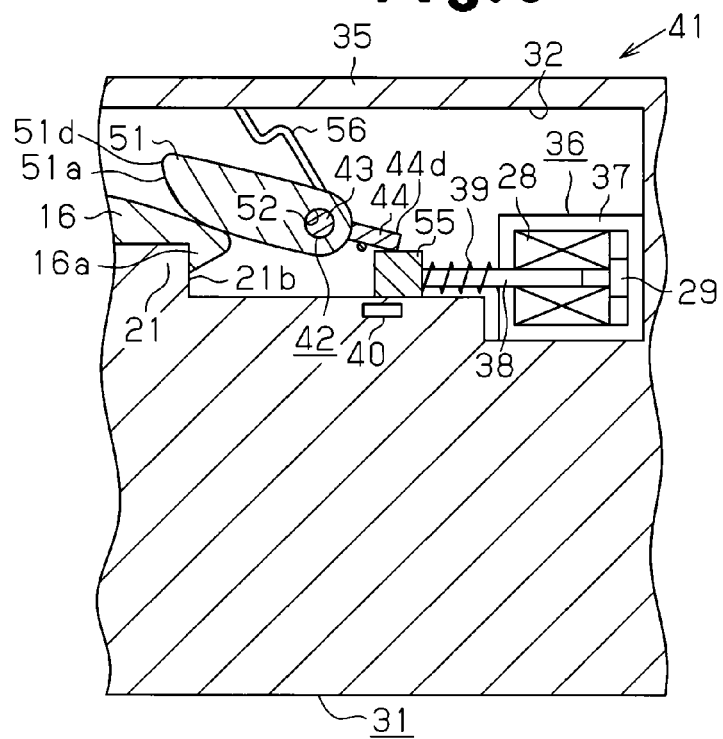
FIG. 6 is a cross-sectional view showing a locked state of the inlet and the lock structure in the first embodiment.

As shown in FIG. 6, the lock block 55 is located below the pivot portion 44 at the second position. In this state, the distal portion 44d of the pivot portion 44 is extremely close to the upper surface of the lock block 55, and the power feeding plug 10 is in a locked state in which removal of the power feeding plug 10 from the inlet 31 is restricted. In the locked state, when the operation portion 19 is pushed downward, an upward force is applied to the lock bar 51 by the upper surface of the hook 16. This applies a pivoting force in the clockwise direction to the lock bar 51 and the lock lever 42. However, the distal portion 44d of the pivot portion 44 comes into contact with the upper surface of the lock block 55. This restricts pivoting of the lock bar 51 and the lock lever 42. Thus, the operation portion 19 cannot be lowered, and the hook 16 cannot be unhooked.

The lock block 55 moves along an inner surface of the inlet 31 (bottom surface of the accommodation chamber 32). Thus, when the lock block 55 receives force from the pivot portion 44 at the second position, the force is received by the inlet 31. Since force is not applied to the plunger 38, problems of the solenoid 36 that would be caused by such force do not occur.

As described above, the charge ECU 75 can determine from the detection result of the sensor 40 that the lock block 55 is located at the second position, that is, the power feeding plug 10 is in the locked state. The charge ECU 75 shifts to a charge enabled state when determining that the power feeding plug 10 is in a locked state and that exterior verification has been accomplished. In the charge enabled state, the charge ECU 75 starts charging the battery 4.

When the charging of the battery 4 is completed, the release switch 76 is operated. When determining that exterior verification has been accomplished and that the release switch 76 has been operated, the charge ECU 75 activates the solenoid 36. Activation of the solenoid 36 returns the lock block 55 to the first position shown in FIG. 5. This switches the power feeding plug 10 to an unlocked state in which the power feeding plug 10 can be removed from the inlet 31. Operation of the operation portion 19 in the unlocked state lifts the hook 16. Accordingly, the lock bar 51 and the lock lever 42 receive pressure from the upper surface of the hook 16 that pivots the lock bar 51 and the lock lever 42 in the counterclockwise direction as viewed in FIG. 4. In this state, the lock block 55 does not restrict pivoting of the pivot portion 44. Accordingly, the hook 16 can be unhooked from the catch 21. The power feeding plug 10 can be removed from the inlet 31 by holding the hook 16 in the unhooked state and pulling out the power feeding plug 10.

When the power feeding plug 10 is removed from the inlet 31, the charge ECU 75 intermittently activates the solenoid 36 to hold the lock block 55 at the first position. For example, when the vehicle 1 travels and vibrates, the urging force of the urging spring 39 may move the lock block 55 to the second position regardless of the attraction force between the plunger 38 and the magnet 29. In such a case, intermittent activation of the solenoid holds the lock block 55 at the first position. Thus, pivoting of the lock bar 51 is not restricted before the power feeding plug 10 is fitted to the inlet 31. This avoids a situation in which the hook 16 cannot be hooked to the catch 21.

The plug lock structure 41 of the first embodiment has the advantages described below.

(1) When the hook 16 is hooked to the catch 21, the lock block 55 is moved from the first position to the second position. When the lock block 55 is arranged at the second position, even if the hook 16 moves away from the catch 21 (upward as viewed in FIG. 6), engagement of the pivot portion 44 of the lock lever 42 with the lock block 55 restricts pivoting of the lock block 55. This prevents the hook 16 from being unhooked, and prevents unauthorized removal of the power feeding plug 10.

(2) The lock block 55 moves between the first position, at which the lock block 55 does not interfere with the pivot portion 44, and the second position, at which the lock block 55 interferes with the pivot portion 44. This shortens the distance between the first and second positions, which is the movement distance of the lock block 55. For example, a fixing member (plunger), which is moved by a solenoid, may contact the upper surface of the hook 16 to directly restrict movement of the hook 16. However, in this case, the fixing member must be arranged to extend over the upper surface of the hook 16. This increases the movement amount of the fixing member in comparison to the movement amount of the lock block 55. Further, to move the fixing member, the main body of the solenoid must be larger than the fixing member in the direction in which the fixing member moves. In comparison with such a structure, the movement amount of the lock block 55 (plunger 38) in the present embodiment is decreased. This allows the solenoid 36 to be reduced in size.

(3) When activated, the solenoid 36 moves the lock block 55 between the first and second positions. This moves the lock block 55 between the first and second positions more easily than when, for example, manually moving the lock block 55.

(4) The lock bar 51 is arranged in the hooking cavity 34 (first accommodation area) so that it can contact the hook 16 that is fitted into the hooking cavity 34. Further, the solenoid 36, the lock lever 42, and the lock block 55, which form a mechanism that restricts pivoting of the lock bar 51, are arranged in the accommodation chamber 32 (second accommodation area). The accommodation chamber 32 is closed except at the insertion hole 35a. Thus, it is difficult to move the solenoid 36, the lock lever 42, and the lock block 55 with a tool or the like through the hooking cavity 34. This prevents unauthorized movement of the lock block 55 from the second position to the first position.

Second Embodiment

A second embodiment will now be described with reference to FIGS. 7 and 8. In the second embodiment, the lock structure 41 differs from that of the first embodiment. Differences from the first embodiment will now be described in detail.

In the second embodiment, a motor 91 is used in lieu of the solenoid 36 shown in FIG. 1. Further, as shown in FIG. 8, a lock bar 92 of the second embodiment differs from that of the first embodiment in that it is formed by a stepped plate. The lock bar 92 is pivotally supported in a state inserted into a hooking cavity 94. For example, the lock bar 92 includes a first plate portion 95, a second plate portion 96, and a connecting portion 97. The first plate portion 95 is located in the hooking cavity 94. The second plate portion 96 projects out of the hooking cavity 94. The connecting portion 97 is inclined and connects the first and second plate portions 95 and 96. The first plate portion 95 is parallel to the second plate portion 96. The height of the second plate portion 96 from the circumferential surface of the inlet 31 (i.e., the bottom surface of the hooking cavity 94) is set so that the second plate portion 96 is located at a higher position than the first plate portion 95. The connecting portion 97 is inclined upward and toward the hook 16. As shown in FIG. 7, a cylindrical pivot shaft 98, which projects from opposite sides of the first plate portion 95, is arranged near the connecting portion 97. The pivot shaft 98 is pivotally fitted into pivot holes 99, which are formed in two opposing side walls of the hooking cavity 94. This pivots the lock bar 92 about the pivot shaft 98. An urging member such as a spring (not shown) constantly urges the lock bar 92 in the clockwise direction as viewed in FIG. 8. The pivoting of the lock bar 92 caused by the urging member is restricted when the connecting portion 97 comes into contact with a lower edge of the hooking cavity (i.e., open end of the hooking cavity 94). In this state of contact, the lock bar 92 is located at an initial position.

The second plate portion 96 includes a lower surface that contacts an upper surface of the hook 16 when the hook 16 is hooked to the catch 21. Further, a lock block 100 is arranged to be movable into the hooking cavity 94. That is, the lock block 100 can move into and out of the region below the left end of the first plate portion 95. In the second embodiment, the lock bar 92 corresponds to a lock member, the second plate portion 96 corresponds to a first end portion of the lock member, and the first plate portion 95 corresponds to a second end portion of the lock member.

Figure 7:
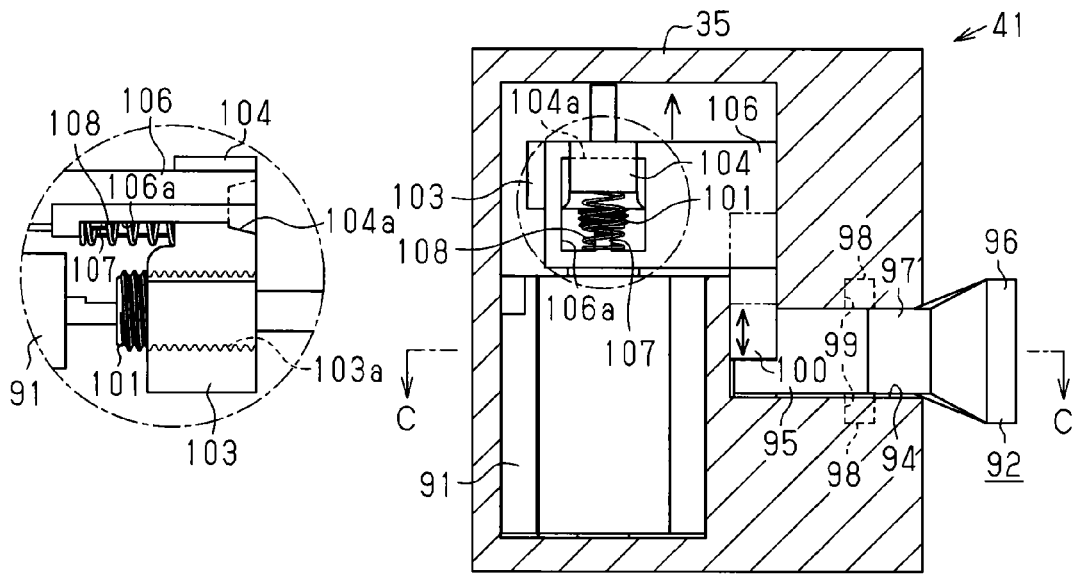
FIG. 7 is a cross-sectional view showing a lock structure in a second embodiment.
Figure 8:
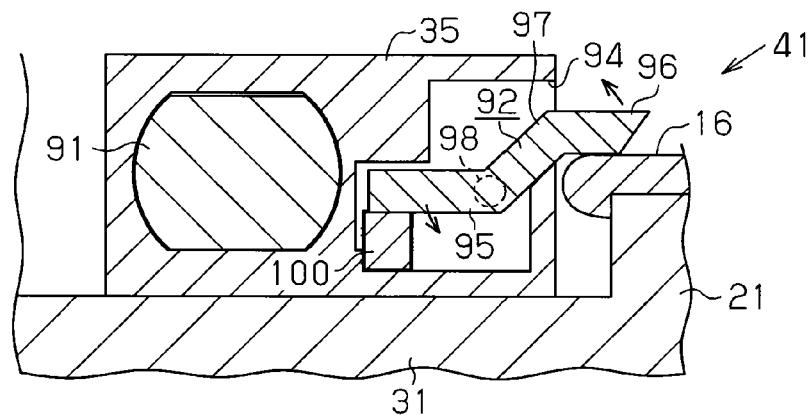
FIG. 8 is a cross-sectional view taken along line C-C in FIG. 7.

Referring to FIG. 7, the motor 91 drives and moves the lock block 100. As shown in the encircled portion of FIG. 7, the motor 91 includes an output shaft connected to a shaft 101. The shaft 101 is threaded. A movable piece 103 is arranged on the shaft 101. A bore 103a extends through the movable piece 103. The inner surface of the movable piece 103 defining the bore 103a is threaded. The bore 103a extends in the axial direction of the shaft 101. The shaft 101 is mated with the bore 103a of the movable piece 103. When the shaft 101 rotates, the movable piece 103 moves along the axial direction of the shaft 101. Further, a follower 104 is arranged on an upper portion of the movable piece 103. The follower 104 includes a recess 104a formed in the surface opposite to the motor 91. The recess 104a extends in a direction orthogonal to the axial direction of the shaft 101 and is formed throughout the entire length of the follower 104. A cooperation piece 106, which is formed integrally with the lock block 100, is hooked to the follower 104. The cooperation piece 106 includes a tetragonal hole 106a. The follower 104 is inserted into the hole 106a from the inlet 31. The recess 104a of the follower 104 is fitted into the frame defining the hole 106a at a location opposite to the motor 91. A projection 107 projects from a side surface of the frame that forms the hole 106a near the motor 91. A coil spring 108 is arranged on the projection 107. The coil spring 108 is located between the side surface of the frame defining the hole 106a and the side surface of the follower 104. Thus, the urging force of the coil spring 108 urges the follower 104 away from the motor 91.

When the motor 91 is driven, the movable piece 103 (follower 104) moves the cooperation piece 106 in the axial direction of the shaft 101. This moves the lock block 100 between a first position and a second position. The lock block 100 does not face the first plate portion 95 at the first position as shown by the broken lines in FIG. 7. The lock block 100 faces the first plate portion at the second position as shown by the solid lines in FIG. 7. Although not illustrated in the drawings, in the same manner as the first embodiment, a sensor is used to detect the position of the lock block 100.

At the first position, the lock block 100 is not present in the hooking cavity 94. Accordingly, when the operation portion 19 is operated and the hook 16 is lifted, the lock bar 92 is pivoted counterclockwise as viewed in FIG. 8 from the initial position. This unhooks the hook 16 and permits removal of the power feeding plug 10 from the inlet 31.

At the second position, the lock block 100 comes into contact with the first plate portion 95. This restricts pivoting of the lock bar 92 in the counterclockwise direction from the initial position. Thus, the hook 16 is maintained in a state engaged with the catch 21 and removal of the power feeding plug 10 from the inlet 31 is restricted.

When foreign matter such as dust hinders movement of the lock block 100, a large force may be applied by the lock block 100 (cooperation piece 106) to the movable piece 103 and the shaft 101. However, even in such a case, the follower 104 relatively moves toward the motor 91 in the hole 106a against the urging force of the coil spring 108. Thus, the lock block 100 does not move in the hooking cavity 94. As a result, even when the cooperation piece 106 (lock block 100) moves when foreign matter is present, a large force is not applied to the cooperation piece 106, the movable piece 103, and the shaft 101. This prevents problems from occurring in the lock structure 41.

The second embodiment has the advantages described below.

(5) The lock block 100, when driven by the motor 91, moves between the first position, at which it restricts pivoting of the lock bar 92, and the second position, at which it restricts pivoting of the lock bar 92. This obtains the same advantages as advantages (1) and (2) of the first embodiment.

(6) The lock block 100 does not directly contact the hook 16 but contacts the first plate portion 95 of the lock bar 92 to restrict movement of the hook 16. This obtains the same advantage as advantage (3) of the first embodiment.

(7) The case 35 includes the hooking cavity 94 (first accommodation area), which receives the lock bar 92, and an accommodation chamber (second accommodation area), which differs from the hooking cavity 94 and receives the lock block 100. This obtains the same advantage as advantage (4) of the first embodiment.

It should be apparent to those skilled in the art that the present invention may be embodied in many other specific forms without departing from the spirit or scope of the invention. Particularly, it should be understood that the present invention may be embodied in the following forms.

In the first and second embodiments, a so-called operation-free key system, which transfers a request signal Srq and an ID code signal Sid between the electronic key 80 and the vehicle 1, is employed as an electronic key system. However, as long as ID verification between the electronic key 80 and the vehicle 1 can be performed, a wireless key system that transmits a request signal in a single direction from the electronic key 80 to the vehicle 1 may be employed. Further, the electronic key system may be eliminated. In this case, for example, when the vehicle door is locked by a mechanical key, the power feeding plug 10 is unlocked. That is, the lock state of the power feeding plug 10 is controlled in accordance with the locked state of the vehicle door. Such a structure that controls the lock state of the power feeding plug 10 in accordance with the locked state of the vehicle door is not restricted to a case in which a mechanical key is employed and may be employed in the electronic key systems of the embodiments described above and a wireless key system.

In the first and second embodiments, a proximity sensor is used as the sensor. However, as long as the position of the lock block 55 (lock block 100) can be monitored, the sensor may be a pressure sensor or the like. In this case, the pressure sensor is arranged at a location at which it is pressed when the lock block 55 (lock block 100) is at the first position or second position.

In the first embodiment, the O ring 45 is used to prevent water and dust from entering the accommodation chamber 32 through the insertion hole 35a. However, any member can be used in lieu of the O ring 45 as long as the gap between the shaft 43 and the wall of the insertion hole 35a can be sealed. Further, the O ring 45 can be eliminated. In this case, it is preferable that the pivoting of the shaft 43 be enabled while minimizing the gap between the shaft 43 and the wall of the insertion hole 35a. This would prevent dust or the like from entering the accommodation chamber 32 to a certain extent.

In the first embodiment, the lock bar 51 is discrete from the lock lever 42. However, the lock bar 51 may be formed integrally with the lock lever 42.

In the first embodiment, a self-sustaining solenoid is used as the solenoid 36. However, a retraction solenoid may be used instead as long as it can move the plunger 38.

The actuator such as the solenoid or the motor 91 may be eliminated. In this case, the shifting to the locked state and the unlocked state, that is, the movement of the lock block 55 (lock block 100) to the first and second positions is manually performed. For example, an operation portion that moves the lock block 55 (lock block 100) is arranged at a position at which it can be operated by a user. The user operates the operation unit to move the lock block 55 (lock block 100) to the first and second positions. For security reasons, it is preferable that the operation portion be arranged inside the vehicle.

In the first embodiment, the solenoid 36 is arranged toward the inner side of the vehicle 1 from the lock block 55 in the fitting and removal directions of the power feeding plug 10. However, the position of the solenoid 36 is not restricted in such a manner. For example, with reference to FIG. 3, the solenoid 36 may be arranged so that the hooking cavity 34 is arranged between the accommodation chamber 32 and the solenoid 36. In this case, the lock block 55 moves in a direction orthogonal to the fitting and removal directions of the hook 16 (upward and downward directions as viewed in FIG. 3).

The lock lever 42 may be eliminated in the first embodiment. That is, the lock bar 51 may function as a lock member. In this case, for example, the lock bar 51, the lock block 55, and the solenoid 36 may be aligned with one another as viewed in FIG. 3. In this structure, the pivot portion 44 is formed near the lock block 55 on the lock bar 51. Further, the shaft 43 that pivotally supports the lock bar 51 may also be formed on the lock bar 51. In this case, the lock bar 51 and the lock block 55 function in the same manner as in the first embodiment.

Figure 9:
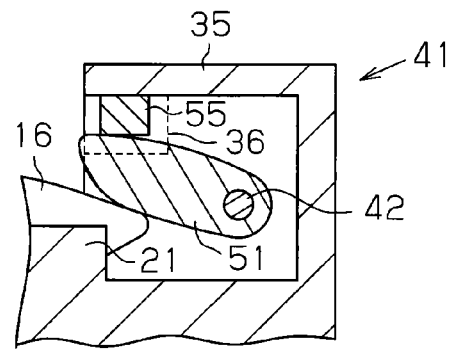
FIG. 9 is a cross-sectional view showing a lock structure in a further embodiment.

The plug lock structure 41 of the first embodiment may be modified, for example, to the structure shown in FIG. 9. In FIG. 9, the lock block 55 is arranged between the upper surface of the lock bar 51 and the upper surface of the hooking cavity 34. The solenoid 36 is arranged, for example, in a direction orthogonal to the plane of FIG. 9. The solenoid 36 moves the lock block 55 between a first position, at which the lock block 55 does not face toward the upper surface of the lock bar 51, and a second position, at which the lock block 55 faces the upper surface of the lock bar 51. In FIG. 9, the first and second positions are arranged along a straight line extending in a direction perpendicular to the plane of the drawing.

In this structure, when the hook 16 is in a hooked state, the lock block 55 restricts pivoting of the lock bar 51 when arranged at the second position. That is, the lock block 55 prevents the hook 16 from moving away from the catch 21. When the lock block 55 is arranged at the first position, the pivoting of the lock bar 51 is permitted. Accordingly, the hook 16 can be unhooked by pivoting the lock bar 51.

In the first embodiment, the distal portion 44*d* of the pivot portion 44 contacts the lock block 55 and restricts pivoting of the lock bar 51. In the second embodiment, the distal portion of the first plate portion 95 contacts the lock block 100 to restrict pivoting of the lock bar 92. However, in each embodiment, the lock block may be moved to near the center of rotation of the lock bar to restrict pivoting of the lock bar.

In the first embodiment, the lock lever 42 and the lock bar 51 are arranged parallel to each other. However, the lock lever 42 and the lock bar 51 do not have to be parallel as long as they are movable relative to each other. Further, in the second embodiment, the lock bar 92 is formed so that the two plate portions 95 and 96 are parallel to each other. However, the two plate portions 95 and 96 do not have to be parallel.

In the first and second embodiments, the power feeding subject is a hybrid type vehicle but may also be an electric vehicle. Further, the power feeding subject is not limited to a vehicle as long as power feeding can be performed with the power feeding plug 10.

Other aspects and advantages of the present invention will become apparent from the following description, taken in conjunction with the accompanying drawings, illustrating by way of example the principles of the invention.

The invention claimed is:

1. A plug lock structure that locks a power feeding plug to an inlet, which is fixed to a power feeding subject, wherein the inlet includes a catch, and the power feeding plug includes a hook, which can be hooked to the catch, and an operation portion, which separates the hook from the catch to unhook the hook, the plug lock structure comprising:
   a lock member that is pivotable in a direction in which the lock member forces the hook against the catch with an urging force, wherein when the hook moves away from the catch, the lock member is pivoted in a direction in which the lock member moves away from the catch together with the hook; and
   a lock block that moves between a first position, at which the lock block permits pivoting of the lock member when the hook moves from a state hooked to the catch, and a second position, at which the lock block restricts pivoting of the lock member by contacting the lock member when the hook moves from the hooked state.

2. The plug lock structure according to claim 1, further comprising a case that accommodates the lock member and the lock block, wherein the case includes a first accommodation area, which receives the lock member, and a second accommodation area, which differs from the first accommodation area and which receives the lock block.

3. The plug lock structure according to claim 2, wherein the lock block moves between the first and second positions in the second accommodation area without entering the first accommodation area.

4. The plug lock structure according to claim 1, wherein the lock member includes a first end portion, which contacts the hook, and a second end portion opposite to the first end portion, and
   the lock block is arranged between the second end portion of the lock member and the inlet when moving at the second position.

5. The plug lock structure according to claim 4, wherein the lock member includes:
   a lock bar that functions as the first end portion of the lock member; and
   a lock lever that functions as the second end portion of the lock member, includes a shaft shared by the lock bar, and rotates integrally with the lock bar about the shaft, wherein the lock lever is separated from the lock bar in an axial direction of the shaft; and
   the plug lock structure further comprises:
   an actuator that moves the lock block between the first position and the second position; and
   a case including a hooking cavity, which accommodates the lock bar and receives the hook, an accommodation chamber, which accommodates the actuator, the lock lever, and the lock block.

6. The plug lock according to claim 5, wherein the case includes an insertion hole through which the shaft is inserted and through which the accommodation chamber and the hooking cavity are communicated, and the plug lock structure further comprises a seal arranged around the insertion hole in the accommodation chamber.

7. The plug lock structure according to claim 5, wherein the actuator is arranged inward from the lock lever relative to the power feeding subject.

8. The plug lock structure according to claim 5, wherein the actuator is a self-sustained solenoid.

* * * * *